US012335613B2

(12) United States Patent
Laifenfeld et al.

(10) Patent No.: US 12,335,613 B2
(45) Date of Patent: Jun. 17, 2025

(54) DETECTION OF CLOSE-RANGE SPECULAR TARGETS

(71) Applicant: Apple Inc., Cupertino, CA (US)

(72) Inventors: Moshe Laifenfeld, Haifa (IL); Jason R. Holloway, Cupertino, CA (US); Alexandra H. Chau, Sunnyvale, CA (US); Gregory Guyomarc'h, San Francisco, CA (US); Connor Henley, Cambridge, MA (US); Oriel Y. Bergig, Shoham (IL)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 18/325,150

(22) Filed: May 30, 2023

(65) Prior Publication Data

US 2024/0406552 A1    Dec. 5, 2024

(51) Int. Cl.
| | |
|---|---|
| *H04N 23/67* | (2023.01) |
| *G01S 7/481* | (2006.01) |
| *G01S 7/4865* | (2020.01) |
| *G01S 17/10* | (2020.01) |
| *G01S 17/86* | (2020.01) |
| *H04N 23/745* | (2023.01) |

(52) U.S. Cl.
CPC ......... *H04N 23/671* (2023.01); *G01S 7/4815* (2013.01); *G01S 7/4816* (2013.01); *G01S 7/4865* (2013.01); *G01S 17/10* (2013.01); *G01S 17/86* (2020.01); *H04N 23/745* (2023.01)

(58) Field of Classification Search
CPC .. H04N 23/671; H04N 23/745; G01S 7/4815; G01S 7/4816; G01S 7/4865; G01S 17/10; G01S 17/86; G01S 17/89
See application file for complete search history.

(56) References Cited

U.S. PATENT DOCUMENTS

| | | | | |
|---|---|---|---|---|
| 7,684,016 | B1* | 3/2010 | Schaefer | G01S 7/4912 356/5.01 |
| 10,928,487 | B2* | 2/2021 | O'Keeffe | G01S 17/42 |
| 11,490,000 | B2* | 11/2022 | Feng | H04N 23/672 |
| 2020/0256993 | A1* | 8/2020 | Oggier | G01S 7/486 |
| 2021/0349192 | A1* | 11/2021 | Wang | G01S 17/931 |
| 2023/0016025 | A1 | 1/2023 | Laifenfeld | |

FOREIGN PATENT DOCUMENTS

| | | |
|---|---|---|
| JP | 2005326506 A | 11/2005 |
| WO | 2022002974 A1 | 1/2022 |

* cited by examiner

Primary Examiner — Nhan T Tran
(74) Attorney, Agent, or Firm — Meitar Patents Ltd.; Daniel Kligler

(57) ABSTRACT

Imaging apparatus includes a camera, which includes an autofocus mechanism. A range sensor includes a transmitter, which includes multiple emitters configured to transmit optical pulses at different angles toward the scene, and a receiver, to receive and sense respective times of flight of the optical pulses that are reflected from the scene. A photodetector outputs a signal indicative of an intensity of reflections from the scene. Control circuitry drives the emitters in alternation to transmit the optical pulses, estimates a range to a target in the scene responsively to the times of flight sensed by the receiver, detects a difference in the signal output by the photodetector in response to the pulses transmitted by different ones of the emitters, and sets the autofocus mechanism responsively to the estimated range as long as the detected difference is no greater than a predefined threshold difference.

20 Claims, 5 Drawing Sheets

DETECTION OF CLOSE-RANGE SPECULAR TARGETS

FIELD

The present invention relates generally to digital photography, and particularly to controlling autofocus functionality in digital cameras.

BACKGROUND

Almost all modern digital cameras use autofocus functionality to adjust the focal distance of the camera. In many cameras, a processor analyzes the images captured by the image sensor in the camera to identify a region of interest in the scene and set the focal distance to bring the region into sharp focus. Cameras may also use a separate rangefinder to measure the distance to a target and set the focal distance accordingly.

The terms "light" and "optical radiation" are used interchangeably in the present description and in the claims to denote electromagnetic radiation in any of the visible, ultraviolet, and infrared spectral ranges.

SUMMARY

Embodiments of the present invention that are described hereinbelow provide improved devices and methods for controlling the focal setting of a digital camera.

There is therefore provided, in accordance with an embodiment of the invention, imaging apparatus, which includes a camera including an autofocus mechanism and configured to capture images of a scene. A range sensor includes a transmitter, which includes multiple emitters configured to transmit optical pulses at different angles toward the scene, and a receiver, configured to receive and sense respective times of flight of the optical pulses that are reflected from the scene. A photodetector is configured to output a signal indicative of an intensity of reflections from the scene in response to the transmitted optical pulses. Control circuitry is configured to drive the emitters in alternation to transmit the optical pulses, to estimate a range to a target in the scene responsively to the times of flight sensed by the receiver, to detect a difference in the signal output by the photodetector in response to the pulses transmitted by different ones of the emitters, and to set the autofocus mechanism responsively to the estimated range as long as the detected difference is no greater than a predefined threshold difference.

In some embodiments, the control circuitry is configured, when the detected difference in the signal is greater than the predefined threshold difference, to disable setting the autofocus mechanism responsively to the range estimated by the range sensor and to set the autofocus mechanism to focus at a distance in the scene that is greater than the estimated range. In a disclosed embodiment, the control circuitry is configured to disable setting the autofocus mechanism responsively to the estimated range for a predefined time period after detecting that the difference in the signal is greater than the predefined threshold difference and then to repeat estimating the range and detecting the difference in the signal after the time period has elapsed.

In some embodiments, the multiple emitters are arranged in a plurality of banks, and the control circuitry is configured to drive the banks in alternation and to detect the difference in the signal output by the photodetector in response to the pulses transmitted by each of the banks of emitters. In a disclosed embodiment, the control circuitry is configured to disable setting the autofocus mechanism responsively to the range estimated by the range sensor when the signal output by the photodetector in response to the pulses transmitted by one of the banks of emitters has an amplitude that is more than twice the amplitude of the signal output by the photodetector in response to the pulses transmitted by the other banks of emitters.

In one embodiment, the multiple emitters include lasers, and the receiver includes single-photon detectors, which are configured to output signals indicative of times of incidence of photons in the reflected optical pulses.

In some embodiments, the photodetector includes a photodiode, which is configured to sense ambient light that is incident on the apparatus. In a disclosed embodiment, the control circuitry is configured to sense a flicker in the ambient light responsively to the signal output by the photodetector and to control the camera so as to mitigate an effect of the flicker on the captured images.

There is also provided, in accordance with an embodiment of the invention, a method for imaging, using a camera including an autofocus mechanism and a range sensor including a transmitter, which includes multiple emitters configured to transmit optical pulses at different angles toward the scene, and a receiver, configured to receive and sense respective times of flight of the optical pulses that are reflected from the scene. The method includes capturing images of a scene using the camera, driving the emitters in alternation to transmit the optical pulses, and estimating a range to a target in the scene responsively to the times of flight sensed by the receiver. A signal is received from a photodetector that is indicative of an intensity of reflections from the scene in response to the transmitted optical pulses. A difference is detected in the signal output by the photodetector in response to the pulses transmitted by different ones of the emitters. The autofocus mechanism is set responsively to the estimated range as long as the detected difference is no greater than a predefined threshold difference.

There is additionally provided, in accordance with an embodiment of the invention, a computer software product for use with a camera including an autofocus mechanism and a range sensor including a transmitter, which includes multiple emitters configured to transmit optical pulses at different angles toward the scene, and a receiver, configured to receive and sense respective times of flight of the optical pulses that are reflected from the scene. The product includes a tangible, non-transitory computer-readable medium in which program instructions are stored, which instructions, when read by a processor, cause to processor to capture images of a scene using the camera, to drive the emitters in alternation to transmit the optical pulses, to estimate a range to a target in the scene responsively to the times of flight sensed by the receiver, to receive a signal from a photodetector that is indicative of an intensity of reflections from the scene in response to the transmitted optical pulses, to detect a difference in the signal output by the photodetector in response to the pulses transmitted by different ones of the emitters, and to set the autofocus mechanism responsively to the estimated range as long as the detected difference is no greater than a predefined threshold difference.

The present invention will be more fully understood from the following detailed description of the embodiments thereof, taken together with the drawings in which:

DETAILED DESCRIPTION

Overview

Figure 1:
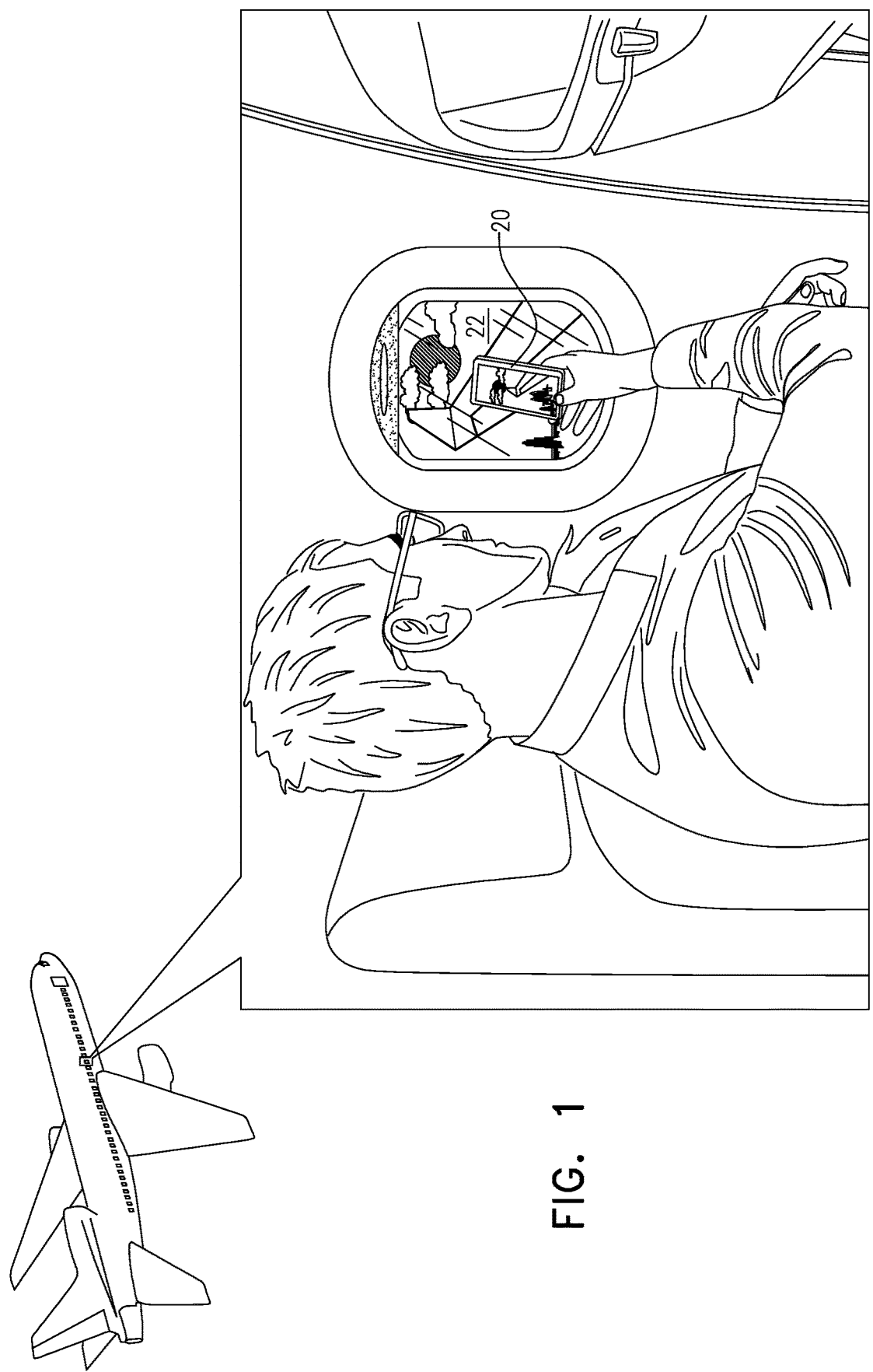
FIG. 1 is a schematic pictorial illustration showing the use of a digital imaging apparatus in capturing an image through a window, in accordance with an embodiment of the invention.

Some digital cameras use a separate range sensor, such as a LIDAR detector, to create a three-dimensional (3D) map of the scene viewed by the camera, and then set the focal distance of the camera based on the locations of objects in the 3D map. The LIDAR detector comprises a transmitter, which directs pulses of light toward the scene, and a receiver, comprising an array of sensors, which sense the times of flight of the light pulses that are reflected from different points in the scene. This sort of LIDAR-based autofocus is particularly (though not exclusively) useful in detecting objects that are close to the camera and may be used to set the camera automatically to a macro-focus mode when a nearby object is detected.

This automatic macro-focus functionality can be problematic, however, when the user of the camera is attempting to photograph a scene through a nearby window. In this case, the LIDAR sensor will detect strong short-range reflections from the window and will drive the autofocus mechanism of the camera to the macro-focus setting. The actual scene on the other side of the window will be blurred in the images captured by the camera. Manually overriding the autofocus settings can be difficult and inconvenient.

Embodiments of the present invention that are described herein address this problem by automatically identifying specular reflections of the LIDAR pulses. Such reflections are typically caused by the presence of a smooth surface, such as the surface of a window, in close proximity to the camera. Because specular reflections can be difficult to identify using the LIDAR receiver itself, a separate photodetector is used for this purpose. Such a photodetector may already be present in the camera for the purpose of sensing ambient light. When the signal from the photodetector is indicative of specular reflections from a nearby surface, the macro-focus mode of the camera is suppressed automatically, without requiring manual override by the user. The camera can then apply other autofocus criteria to focus on more distant targets that are seen through the window.

In some embodiments, the LIDAR transmitter comprises multiple emitters or banks of emitters, which are driven to transmit optical pulses in alternation. Multi-bank LIDAR transmitters of this sort are described, for example, in U.S. Patent Application Publication 2020/0256993, whose disclosure is incorporated herein by reference. Each bank (comprising one or more emitters) emits light toward the scene at a different, respective angle, meaning that the light emitted by each bank will be reflected from a specular target at a correspondingly different angle.

The disclosed embodiments take advantage of the alternating operation the emitters. Because the photodetector is located at a certain offset from the LIDAR transmitter, the intensity of the light that is reflected back to the photodetector from a nearby specular target from one of the emitters or banks of emitters will be much stronger than the reflected light from the other emitters. Therefore, the amplitude of the signal output from the photodetector will be much higher in the time slot during which this emitter or bank is actuated in comparison with the time slots of the other banks. Upon detecting this sort of time-dependent discrepancy in the signals output by the photodetector, the control circuitry in the camera will automatically suppress the LIDAR-based range measurement. The autofocus mechanism in the camera will then focus properly through the window onto the more distant scene.

Thus, the embodiments that are disclosed herein provide imaging apparatus comprising a camera, which comprises an autofocus mechanism and is configured to capture images of a scene. The apparatus also comprises a range sensor, such as a LIDAR detector, comprising a transmitter and a receiver. The transmitter comprises multiple emitters, which transmit optical pulses at different angles toward the scene. The receiver receives and senses respective times of flight of the optical pulses that are reflected from the scene. In addition, a photodetector, such as a photodiode, outputs a signal indicative of the intensity of light received from the scene, including reflections of the transmitted optical pulses.

Control circuitry in the apparatus drives the emitters in the range sensor to transmit optical pulses in alternation and estimates the range to a target in the scene based on the times of flight of the reflected optical pulses that are sensed by the receiver. The control circuitry also detects differences in the signal output by the photodetector in response to the pulses transmitted by different ones of the emitters. The control circuitry sets the autofocus mechanism of the camera according to the estimated range provided by the range sensor as long as the detected difference in the signal output by the photodetector is no greater than a predefined threshold difference. When the detected difference in the signal is greater than this threshold difference, however, the control circuitry disables this functionality, i.e., the autofocus mechanism ignores the range estimate provided by the range sensor and instead sets the camera to focus at a distance in the scene that is greater than the range estimated by the range sensor.

System Description

FIG. 1 is a schematic pictorial illustration showing the use of a digital imaging apparatus 20 in capturing an image through a window 22, in accordance with an embodiment of the invention. Apparatus 20 in this example has the form of a smartphone, but the principles of the present embodiments are equally applicable to other sorts of digital cameras and imaging devices. A range sensor in apparatus 20 detects window 22 at close range and could therefore cause the control circuitry in the apparatus to switch automatically to macro-focus mode, focusing at the location of the window.

In the present embodiment, however, apparatus 20 detects the specular reflections of the optical pulses emitted by the range sensor, and accordingly disables the automatic macro-focus setting. The apparatus is thus able to focus automatically on the more distance targets that are seen through window 22.

Figure 2A:
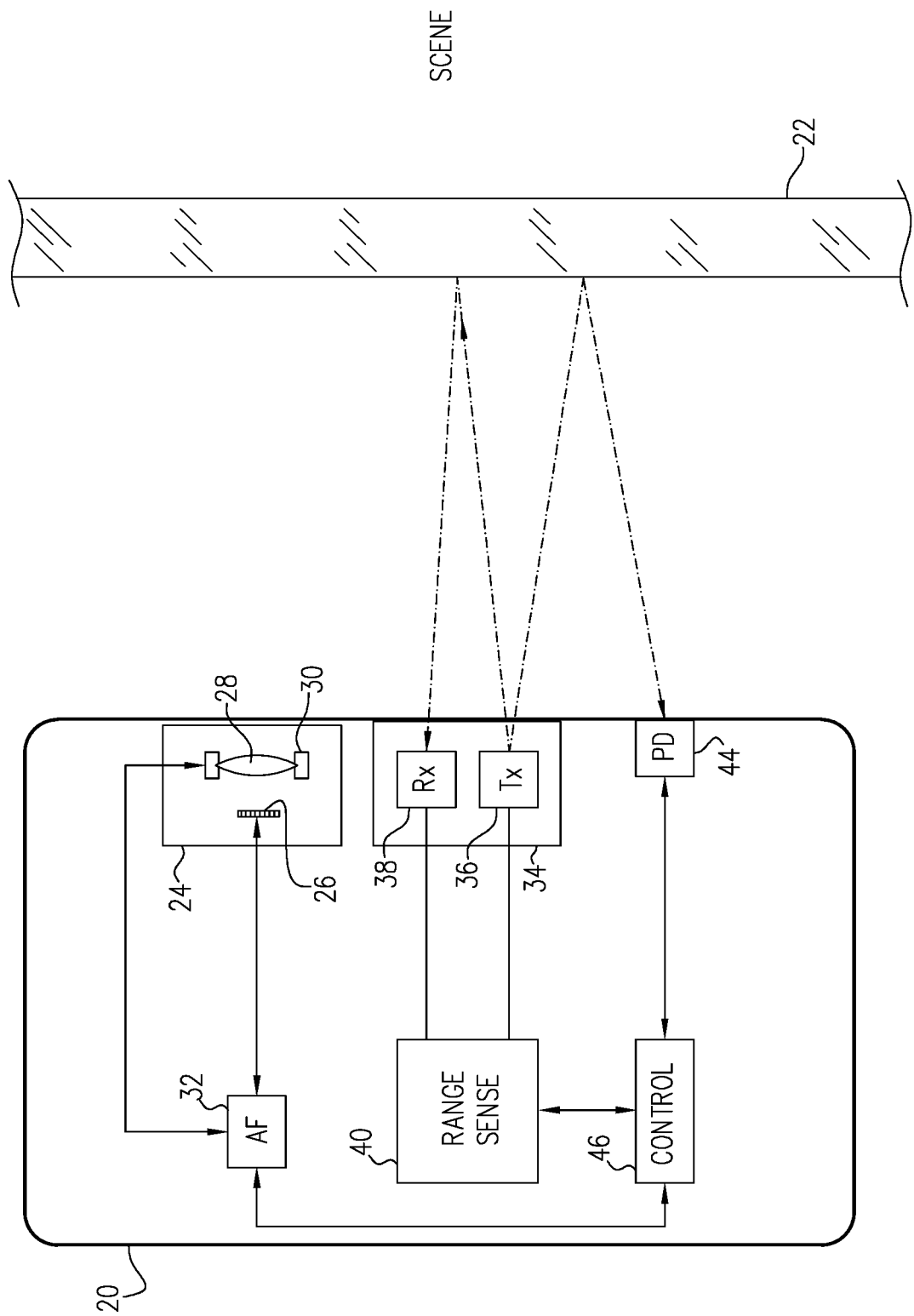
FIG. 2A is a schematic side view of a digital imaging apparatus with autofocus based on LIDAR, in accordance with an embodiment of the invention.
Figure 2B:
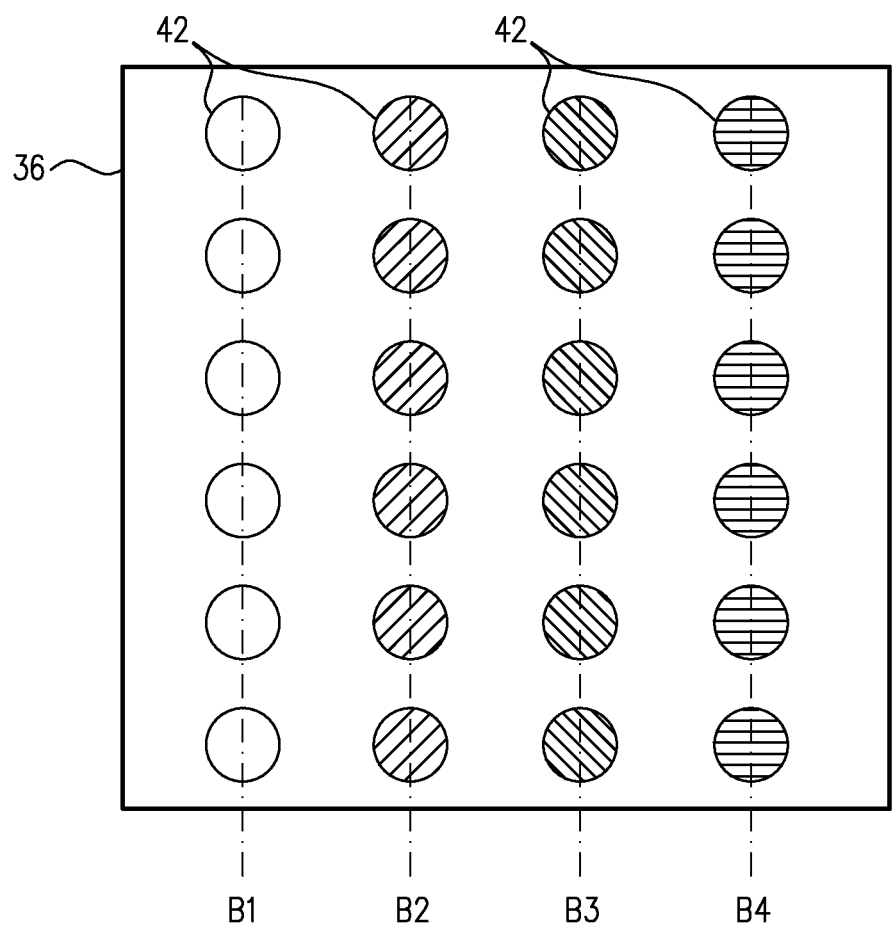
FIG. 2B is a schematic frontal view of a multi-bank transmitter used in the LIDAR of FIG. 2A.

FIG. 2A is a schematic side view showing functional components of imaging apparatus 20, while FIG. 2B is a schematic frontal view of a multi-bank transmitter 36 used in the apparatus. Apparatus 20 comprises a camera 24, which captures images of a scene (which in the present example is seen through window 22). Camera 24 comprises an image sensor 26 and objective optics 28. An autofocus mechanism 30 adjusts the focal properties of camera 24, for example by shifting the position of optics 28 or of image sensor 26 or changing the effective focal length of the optics. Any suitable type of autofocus mechanism that is known in the art may be used for this purpose. An autofocus controller 32 drives autofocus mechanism 30 based on analysis of images output by camera 24, as well as on control signals from other elements of apparatus 20.

Apparatus 20 comprises a range sensor in the form of a LIDAR detector 34, which measures distances from the apparatus to different points in the scene. LIDAR detector 34 comprises a transmitter 36, comprising multiple emitters 42, which transmit optical pulses at different angles toward the scene. In the present example, emitters 42 comprise lasers, such as vertical-cavity surface-emitting lasers (VCSELs), which are arranged in multiple banks, labeled B1, B2, B3, and B4. Projection optics (not shown in the figures) direct the optical pulses emitted from each of the banks toward the scene at a different, respective angle.

A receiver 38 receives and senses respective times of flight of the optical pulses that are reflected from the scene. Receiver 38 typically comprises an array of detectors, along with optics that form an image of the scene on the detector (not shown in the figures). For example, the detectors may comprise single-photon avalanche photodiodes (SPADs), which output signals indicative of the times of incidence of photons in the reflected optical pulses. A range sensing circuit 40 drives the banks of emitters 42 to transmit optical pulses in alternation. The range sensing circuit processes the signals output by receiver 38 to measure the times of flight of the optical pulses to and from points in the scene, and hence the distances from LIDAR detector 34 to each of the points in the scene. Taken together, these distances form a three-dimensional (3D) map of the scene, also referred to as a depth map. LIDAR detector may be adapted specifically for detecting close-range targets, for example as described in U.S. Patent Application Publication 2023/0016025, whose disclosure is incorporated herein by reference.

Further details of LIDAR detector 34 and range sensing circuit 40 are beyond the scope of the present description and are omitted here for the sake of brevity. The above-mentioned U.S. Patent Application Publications 2020/0256993 and 2023/0016025 give additional details of multi-bank transmitters, sensing arrays, optics, and processing circuits that may be applied in apparatus 20. As explained in U.S. Patent Application Publications 2020/0256993, the use of multiple banks of emitters, actuated in alternation, is advantageous in optimizing the allocation of the available power and processing resources in the apparatus. The present embodiments take advantage of this multi-bank operation for another purpose: to detect specular reflections from window 22.

This latter purpose is achieved using a photodetector 44, such as a PIN photodiode, separate from receiver 38, which senses ambient light that is incident on apparatus 20 and outputs a signal that is indicative of the ambient light level. Photodetector 44 typically has a wide field of view and is used, inter alia, to sense flicker in the ambient light, for example due to fluorescent lighting. This flicker can disrupt the images captured by camera 24. A camera controller 46 in apparatus 20 detects the flicker in the signal output by the photodetector and mitigates the effect of the flicker by appropriate control of camera 24 and/or processing of the images output by the camera. Alternatively or additionally, photodetector 44 may be used for other purposes, or it may be dedicated solely to detection of specular reflections. The spacing between photodetector 44 and LIDAR detector 34 is small enough to provide substantial overlap between the fields of view of the photodetector and LIDAR detector but large enough to prevent saturation of the photodetector by transmitter 36. The wide field of view of photodetector 44 (typically wider than that of receiver 38) is useful in capturing spectral reflections even when the axis of LIDAR detector 34 is tilted relative to window 22, rather than normal to the window as shown in FIG. 2A.

The signal output by photodetector 44 is indicative of the intensity of reflections from the scene of the optical pulses that are transmitted by emitters 42. Because photodetector 44 has a wide field of view, under most circumstances, the intensity of the reflections received by the photodetector, and thus the amplitude of the signal that it outputs, will be roughly the same for all the banks of emitters. In the scenario shown in FIG. 2A, however, optical pulses that are emitted from transmitter 36 at a certain angle toward window 22 will be reflected specularly toward photodetector 44, whereas pulses emitted at other angles will be reflected in other directions. As a result, the reflected optical pulses from one of the banks of emitters 42 will cause photodetector 44 to output a signal with much greater amplitude than the pulses from the other banks, depending on the angular inclination of apparatus 20 relative to window 22.

In some circumstances, receiver 38 may be able to sense the specular reflections independently of photodetector 44. Because of the narrower field of view of receiver 38, as well as the use of a sparse array of single-photon detectors in the receiver (as described in the above-mentioned publications), however, photodetector 44 is able to detect specular reflections from nearby targets more reliably than would be possible using receiver 38 alone.

Camera controller 46 receives signals from the other elements of apparatus 20 and regulates autofocus controller 32 accordingly. When range sensing circuit 40 detects the presence of a nearby target in the field of view of camera, controller 46 will ordinarily instruct autofocus controller 32 to operate in macro mode, i.e., to adjust autofocus mechanism 30 to focus camera 24 at short range. To avoid erroneously focusing on window 22, however, camera controller 46 also processes the signal output by photodetector 44, to detect the difference in the amplitudes of the signal that are output in response to the pulses transmitted by the different banks of emitters. As explained above, when the nearby target is an actual object of interest, the difference in the signal amplitudes due to the different banks should be small. When controller 46 detects that the signal due to one of the banks is much stronger than those due to the other banks, however, it will ignore the range measurement output by range sensing circuit 40. As a result, autofocus controller 32 will drive autofocus mechanism 30 to focus camera 24 at a greater distance, notwithstanding the presence of window 22.

Although FIGS. 2A and 2B show a certain selection and layout of the components in image apparatus 20 for the sake of concreteness and clarity, the principles of the present invention may similarly be applied using sensors and system elements in other configurations. For example, transmitter 36 may comprise other arrangements of banks of emitters, or it may comprise individual emitters that are driven in alternation.

As another example, although autofocus controller 32, range sensing circuit 40, and camera controller 46 are shown in FIG. 2A as separate functional blocks, the functions of these blocks may be integrated together in one or more control circuits. Therefore, autofocus controller 32, range sensing circuit 40, and camera controller 46 are referred to collectively in the present description and in the claims simply as "control circuitry." The functions of the control circuitry may be implemented in hard-wired or programmable logic circuits, or in software or firmware running on a programmable processor, such as a microprocessor or microcontroller, or in a combination of such circuits and components. All such alternative implementations of the elements of apparatus 20 are considered to be within the scope of the present invention. To the extent that certain functions are carried out by a programmable processor, the software for this purpose may be stored on tangible, non-transitory computer-readable media, such as optical, magnetic, or electronic memory media.

Method for Autofocus Control

Figure 3A:
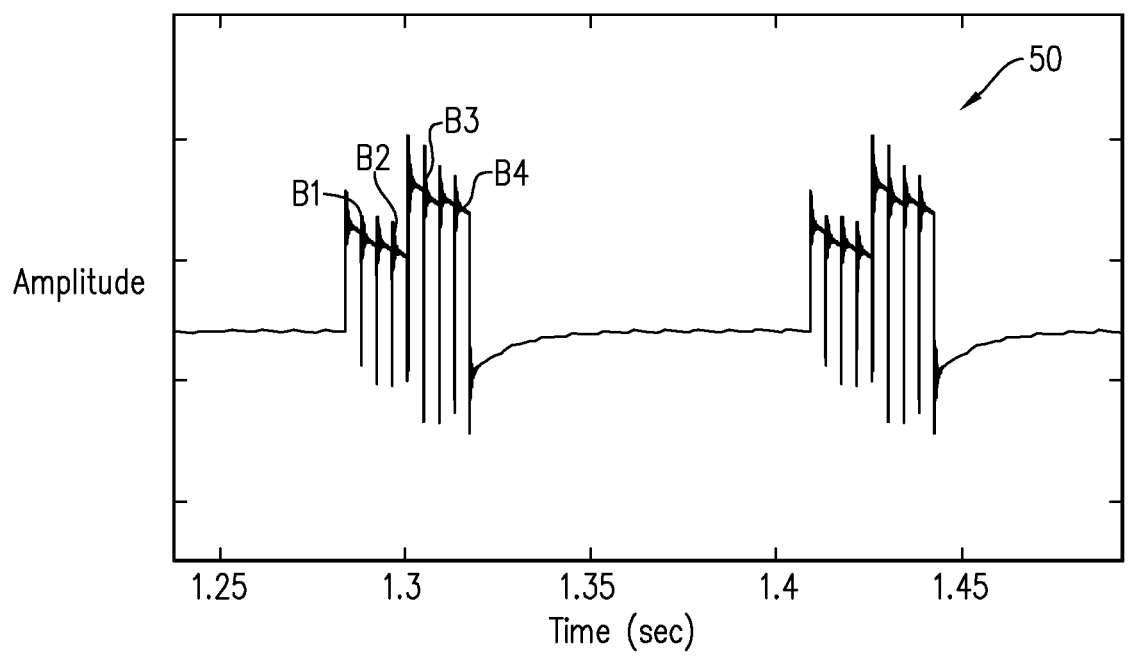
FIGS. 3A and 3B are plots that schematically illustrate signals output by a detector in the apparatus of FIG. 2A, in accordance with an embodiment of the invention.
Figure 3B:
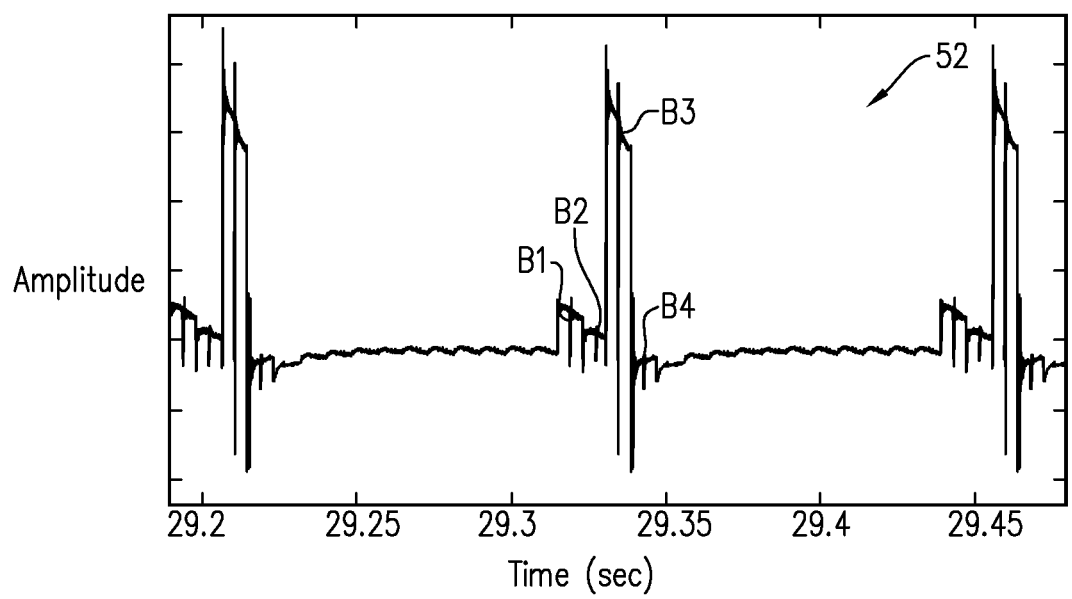

FIGS. 3A and 3B are plots that schematically illustrate signals output by photodetector 44 in apparatus 20 (FIG. 2A), in accordance with an embodiment of the invention. FIG. 3A shows a plot 50 of the signal output by photodetector 44 due to diffuse reflections from a nearby object. The time slots corresponding to actuation of each of the banks of emitters (B1, B2, B3, and B4) are marked in the figure. The amplitudes of the signal due to all of the banks are similar, to within a margin of about 50%.

FIG. 3B shows a plot 52 of the signal output by photodetector 44 in the presence of window 22. In this case, the amplitude of the signal in the time slot of bank B3 is more than twice the amplitude in the other time slots. By comparing these amplitudes, camera controller 46 is able to detect the presence of window 22 in the field of view of camera 24. In this case, the camera controller suppresses the range measurement provided by LIDAR detector 34 and thus avoids undesired activation of the macro-focus mode.

As illustrated by FIGS. 3A and 3B, camera controller 46 can apply various sorts of thresholds in deciding whether to use or deactivate the macro-focus mode based on the range measurement provided by LIDAR detector 34. For example, the camera controller may apply an absolute threshold, meaning that the range measurement is disregarded when the absolute difference in amplitude between the signal output by photodetector 44 due to a given emitter bank and the other emitter banks is greater than the threshold. Alternatively or additionally, the threshold may be relative, meaning that the range measurement is disregarded when the amplitude of the signal output by photodetector 44 due to one of the emitter banks is more than some multiple of the signals due to the other banks, for example more than twice the next-highest amplitude. All such alternative formulations of the threshold conditions are considered to be within the scope of the present invention.

Figure 4:
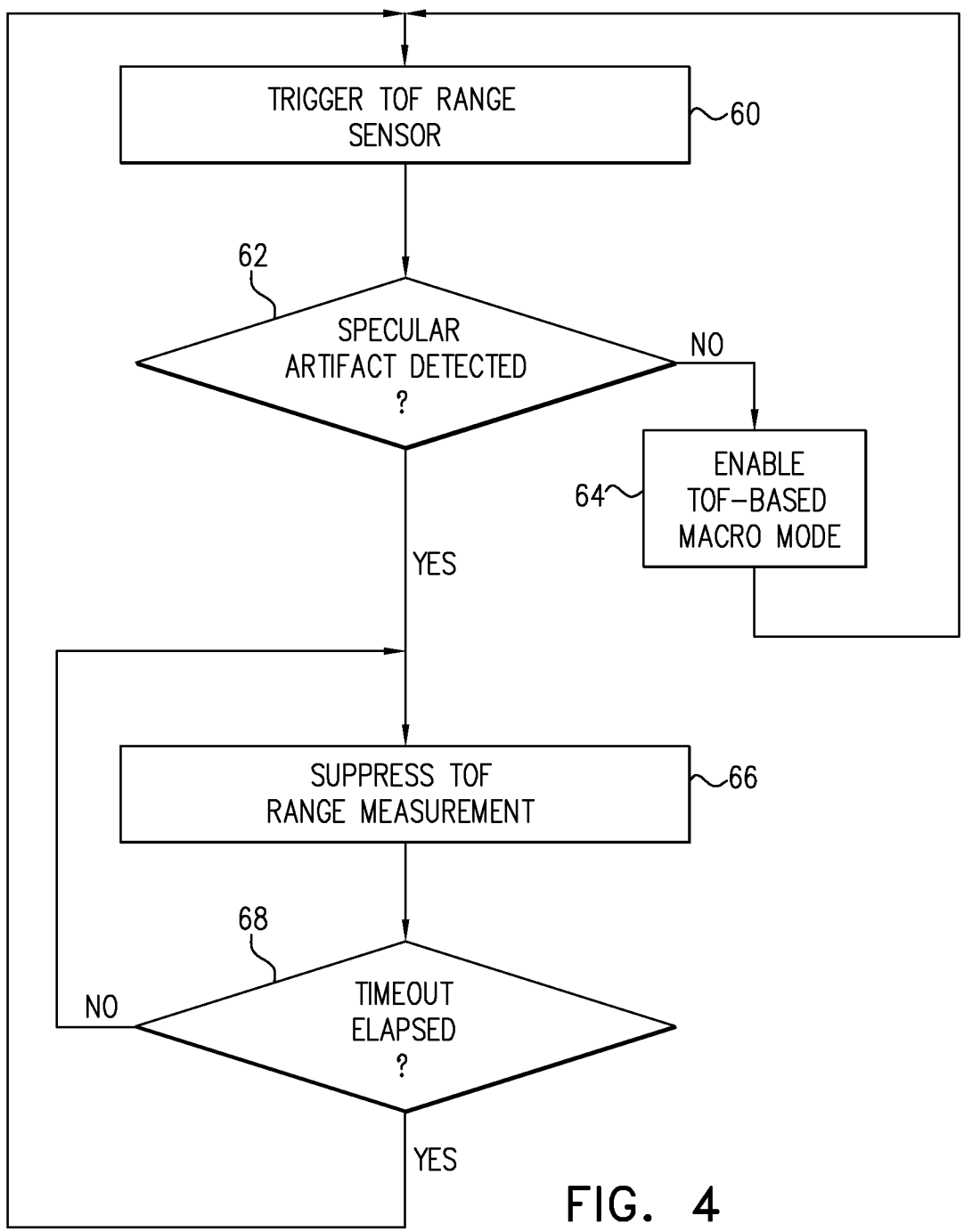
FIG. 4 is a flow chart that schematically illustrates a method for controlling autofocus, in accordance with an embodiment of the invention.

FIG. 4 is a flow chart that schematically illustrates a method for controlling autofocus, in accordance with an embodiment of the invention. The method is described here, for the sake of convenience and clarity, with reference to imaging apparatus 20; but it could similarly be implemented, mutatis mutandis, in other sorts of imaging devices having the appropriate autofocus and range-finding capabilities. The disclosed method is performed cyclically during the operation of the apparatus.

Range sensing circuit 40 periodically triggers LIDAR transmitter 36 to fire a succession of optical pulses toward the scene observed by apparatus 20 and to measure the times of flight of the pulses using receiver 38, at a range triggering step 60. As transmitter 36 fires, camera controller 46 receives and processes the signal output by photodetector 44. The camera controller detects the difference in the amplitudes of the signal output by the photodetector in response to the pulses transmitted by the different banks of the emitters, at a specular artifact detection step 62. As long as this difference in the signal amplitudes is no greater than predefined threshold difference, the camera controller will instruct autofocus controller 32 to set autofocus mechanism 30 according to the estimated range provided by LIDAR detector 34, at a time-of-flight (TOF) based setting step 64. In this case, if LIDAR detector 34 indicates the presence of a target at a short distance from apparatus 20, the autofocus controller may set the autofocus mechanism to operate in a macro-focus mode.

On the other hand, if camera controller 46 detects at step 62 that the difference between the amplitudes of the signals output by photodetector 44 in response to the different banks of emitters is greater than the threshold, the camera controller will disable setting the autofocus mechanism according to the range estimated by LIDAR detector 34, at a TOF suppression step 66. In this case, autofocus controller 32 will set autofocus mechanism 30 independently of the output of LIDAR detector 34, so that camera 24 will focus at a distance in the scene that is greater than the range estimated by the LIDAR detector. For example, the autofocus controller may set the autofocus mechanism to optimize the sharpness of the details captured by image sensor 26 in a region of interest in the scene. In this manner, apparatus 20 avoids erroneously focusing at the distance to window 22. Based on the signals received at step 62, camera controller 46 may also be able to estimate the orientation of window 22 relative to apparatus 20 by comparing the signals output by receiver 38 and photodetector 44 and using the known geometry of the banks of emitters 42 in transmitter 36.

After detecting a specular artifact and suppressing the TOF-based autofocus, camera controller 46 waits for a predefined time period, for example several seconds, at a timeout step 68. Once the timeout has elapsed, the camera controller returns to step 60 to repeat the range measurement by LIDAR detector 34 and to check for specular artifact if necessary. The timeout period may be variable and may increase or decrease adaptively depending on operating conditions. The process of FIG. 4 typically continues to cycle as long as apparatus 20 is in operation.

The embodiments described above are cited by way of example, and the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
    a camera comprising an autofocus mechanism and configured to capture images of a scene;
    a range sensor comprising a transmitter, which comprises multiple emitters configured to transmit optical pulses at different angles toward the scene, and a receiver, configured to receive and sense respective times of flight of the optical pulses that are reflected from the scene;

a photodetector configured to output a signal indicative of an intensity of reflections from the scene in response to the transmitted optical pulses; and control circuitry, configured to drive the emitters in alternation to transmit the optical pulses, to estimate a range to a target in the scene responsively to the times of flight sensed by the receiver, to detect a difference in the signal output by the photodetector in response to the pulses transmitted by different ones of the emitters, and to set the autofocus mechanism responsively to the estimated range as long as the detected difference is no greater than a predefined threshold difference.

2. The apparatus according to claim 1, wherein the control circuitry is configured, when the detected difference in the signal is greater than the predefined threshold difference, to disable setting the autofocus mechanism responsively to the range estimated by the range sensor and to set the autofocus mechanism to focus at a distance in the scene that is greater than the estimated range.

3. The apparatus according to claim 2, wherein the control circuitry is configured to disable setting the autofocus mechanism responsively to the estimated range for a predefined time period after detecting that the difference in the signal is greater than the predefined threshold difference and then to repeat estimating the range and detecting the difference in the signal after the time period has elapsed.

4. The apparatus according to claim 1, wherein the multiple emitters are arranged in a plurality of banks, and wherein the control circuitry is configured to drive the banks in alternation and to detect the difference in the signal output by the photodetector in response to the pulses transmitted by each of the banks of emitters.

5. The apparatus according to claim 4, wherein the control circuitry is configured to disable setting the autofocus mechanism responsively to the range estimated by the range sensor when the signal output by the photodetector in response to the pulses transmitted by one of the banks of emitters has an amplitude that is more than twice the amplitude of the signal output by the photodetector in response to the pulses transmitted by the other banks of emitters.

6. The apparatus according to claim 1, wherein the multiple emitters comprise lasers, and the receiver comprises single-photon detectors, which are configured to output signals indicative of times of incidence of photons in the reflected optical pulses.

7. The apparatus according to claim 1, wherein the photodetector comprises a photodiode, which is configured to sense ambient light that is incident on the apparatus.

8. The apparatus according to claim 7, wherein the control circuitry is configured to sense a flicker in the ambient light responsively to the signal output by the photodetector and to control the camera so as to mitigate an effect of the flicker on the captured images.

9. A method for imaging, using a camera including an autofocus mechanism and a range sensor including a transmitter, which includes multiple emitters configured to transmit optical pulses at different angles toward a scene, and a receiver, configured to receive and sense respective times of flight of the optical pulses that are reflected from the scene, the method comprising:

capturing images of the scene using the camera;
driving the emitters in alternation to transmit the optical pulses;
estimating a range to a target in the scene responsively to the times of flight sensed by the receiver;

receiving a signal from a photodetector that is indicative of an intensity of reflections from the scene in response to the transmitted optical pulses;
detecting a difference in the signal output by the photodetector in response to the pulses transmitted by different ones of the emitters; and
setting the autofocus mechanism responsively to the estimated range as long as the detected difference is no greater than a predefined threshold difference.

10. The method according to claim 9, and comprising, when the detected difference in the signal is greater than the predefined threshold difference, disabling setting of the autofocus mechanism responsively to the range estimated by the range sensor and setting the autofocus mechanism to focus at a distance in the scene that is greater than the estimated range.

11. The method according to claim 10, wherein disabling setting of the autofocus mechanism responsively to the estimated range comprises setting the autofocus mechanism independently of the range sensor for a predefined time period after detecting that the difference in the signal is greater than the predefined threshold difference, and then repeating estimating the range and detecting the difference in the signal after the time period has elapsed.

12. The method according to claim 9, wherein the multiple emitters are arranged in a plurality of banks, and wherein driving the emitters comprises driving the banks in alternation, and detecting the difference comprises assessing the difference in the signal output by the photodetector in response to the pulses transmitted by each of the banks of emitters.

13. The method according to claim 12, wherein setting the autofocus mechanism comprises disabling setting of the autofocus mechanism responsively to the range estimated by the range sensor when the signal output by the photodetector in response to the pulses transmitted by one of the banks of emitters has an amplitude that is more than twice the amplitude of the signal output by the photodetector in response to the pulses transmitted by the other banks of emitters.

14. The method according to claim 9, wherein the multiple emitters include lasers, and the receiver includes single-photon detectors, which are configured to output signals indicative of times of incidence of photons in the reflected optical pulses.

15. The method according to claim 9, wherein the photodetector comprises a photodiode, which is configured to sense ambient light that is incident on the camera.

16. The method according to claim 15, and comprising sensing a flicker in the ambient light responsively to the signal output by the photodetector and controlling the camera so as to mitigate an effect of the flicker on the captured images.

17. A computer software product for use with a camera including an autofocus mechanism and a range sensor including a transmitter, which includes multiple emitters configured to transmit optical pulses at different angles toward a scene, and a receiver, configured to receive and sense respective times of flight of the optical pulses that are reflected from the scene, wherein the product comprises a tangible, non-transitory computer-readable medium in which program instructions are stored, which instructions, when read by a processor, cause to processor to capture images of the scene using the camera, to drive the emitters in alternation to transmit the optical pulses, to estimate a range to a target in the scene responsively to the times of flight sensed by the receiver, to receive a signal from a photodetector that is indicative of an intensity of reflections from the scene in response to the transmitted optical pulses, to detect a difference in the signal output by the photodetector in response to the pulses transmitted by different ones of the emitters, and to set the autofocus mechanism responsively to the estimated range as long as the detected difference is no greater than a predefined threshold difference.

18. The product according to claim 17, wherein when the detected difference in the signal is greater than the predefined threshold difference, the instructions cause the processor to disable setting of the autofocus mechanism responsively to the range estimated by the range sensor and to set the autofocus mechanism to focus at a distance in the scene that is greater than the estimated range.

19. The product according to claim 18, wherein the instructions cause the processor to set the autofocus mechanism independently of the range sensor for a predefined time period after detecting that the difference in the signal is greater than the predefined threshold difference, and then to repeat estimating the range and detecting the difference in the signal after the time period has elapsed.

20. The product according to claim 17, wherein the multiple emitters are arranged in a plurality of banks, and wherein the instructions cause the processor to drive the banks in alternation, and to detect the difference in the signal output by the photodetector in response to the pulses transmitted by each of the banks of emitters.

* * * * *